United States Patent Office 3,177,063
Patented Apr. 6, 1965

3,177,063
PROCESS FOR MANUFACTURING COMPLEX FERTILIZERS, PARTIALLY SOLUBLE IN WATER
Louis Andrès, Villeneuve-la-Garenne, and André Kleiber, Enghien, France, assignors to Potasse et Engrais Chimiques, Paris, France
No Drawing. Filed Oct. 26, 1961, Ser. No. 147,723
Claims priority, application France, Nov. 9, 1960, 843,407
3 Claims. (Cl. 71—37)

This invention relates to a process for manufacturing complex fertilizers of the nitro-phosphate type and containing an amount of water-soluble $P_2O_5$, said fertilizers being obtained by causing a rock phosphate to be attacked by nitric acid (if desired, with sulphuric acid added thereto), followed by a neutralisation with ammonia.

Many processes are known for manufacturing complex fertilizers which contain nitrogen, $P_2O_5$, and eventually potash, part of this $P_2O_5$ being present in water-soluble form, while the remainder is present in soluble form in a more or less alkaline solution of ammonium citrate. According to one of these processes nitric acid is caused to attack rock phosphate with or without ammonium nitrate solution. The obtained liquor is then cooled, so as to cause calcium nitrate to be crystallised under a hydrated form or as a double salt with ammonium nitrate. The precipitate is then separated in any suitable way (filtering or centrifuging) in order to obtain a solid containing on one side calcium nitrate and on the other side a solution in which the $Ca/P_2O_5$ molecular ratio is less than 2. By ammoniating this solution, a paste is obtained, which after granulating and drying, yields a fertilizer containing ammonium nitrate, dicalcium phosphate and ammonium phosphate. A potash salt may also be added, if desired, in order to obtain a ternary fertilizer.

That process presents however both technical and commercial drawbacks.

The technical ones are due to filtering difficulties, loss of $P_2O_5$ adsorbed on the precipitate and the difficulty encountered when treating the obtained filtering cake to convert it into a commercial product.

The commercial drawbacks result from the necessity of selling two products of related production whilst commercial demand is not correlative.

According to another process, in which nitric acid is used for effecting the attack of rock phosphate, phosphoric ions are introduced into the mass either fully during the attack or during ammoniating. These ions convert firstly the remaining calcium nitrate of the mass into dicalcium phosphate, the phosphoric ions in excess supplying ammonium phosphate. After granulating and drying, a fertilizer is obtained containing ammonium nitrate, dicalcium phosphate and ammonium phosphate. Such a process makes it necessary to provide a separate unit for production of phosphoric acid, and this is a serious drawback.

In order to avoid the necessity of filtering and of adding phosphoric acid, use of an acid which would be cheaper than phosphoric acid, namely sulphuric acid, has been attempted.

However, a fertilizer containing the maximum amount of water-soluble $P_2O_5$ in relation to the used amount of sulphuric acid cannot be directly obtained.

In fact, if sulphuric ions are added into the reaction mass while it is still acid in a sufficient amount to cause a large part of the calcium to be present in the form of calcium sulphate it is not possible to obtain a final product containing an amount of water-soluble $P_2O_5$ corresponding to the amount of the introduced acid, as a portion of the calcium sulphate will be soluble and will thus form dicalcium phosphate under the conditions obtaining at the time.

In fact, when calcium sulphate is present in an aqueous medium having a pH exceeding 3.5 and containing phosphoric ions, the solubility product of the sulphate being higher than that of dicalcium phosphate, it reacts rapidly enough with phosphoric ions to yield dicalcium phosphate in precipitated form.

Corresponding reaction is as follows:

$$CaSO_4 + PO_4H^= \rightleftharpoons PO_4CaH + SO_4^= \qquad (1)$$

The process contemplated by this invention, while preventing the aforesaid reaction (1) from being effected in the direction from the left to the right, makes it possible to maintain the calcium sulphate in the presence of the phosphoric ions, and thereby allows the preparation of complex fertilizers which contain the highest proportion of $P_2O_5$ soluble in water relatively to the amount of sulphuric acid used.

According to the invention, the process of manufacturing a complex nitro-sulphuric fertilizer containing a part of its $P_2O_5$ in a water-soluble form, which comprises the attack of a rock phosphate by nitric acid and possibly by sulphuric acid, followed by a neutralization by ammonia, is characterized in that to the reaction mass at an acid pH there are added both metal ions formerly known to stabilize dicalcium phosphate and sulphuric acid in such an amount that the molar ratio $H_2SO_4/P_2O_5$ exceeds 1.3, said molar ratio being increased proportionally when larger amounts of water-soluble $P_2O_5$ contained in the fertilizer are desired.

In fact, it has been discovered this surprising result that by adding the aforesaid metal ions to an acid reaction mass, the calcium sulphate therein is stabilized whereby the formation of dicalcium phosphate according to reaction (1) is prevented.

The metal ions used to stabilize calcium sulphate are selected from the group of the following metals formerly known to stabilize dicalcium phosphate, that is to say to prevent its transformation into tricalcium phosphate in the manufacture of complex fertilizers: magnesium, aluminium, iron, manganese, such ions being introduced by means of a compound, preferably inexpensive, soluble in the reaction medium.

Following sources of Mg ions may be mentioned among usable compounds: oxides, carbonates, phosphates, silicates, sulphates and particularly $(NO_3)_2Mg$, $6H_2O$ or $SO_4Mg$, $7H_2O$, or $SO_4Mg$, $1H_2O$.

With respect to aluminium, phosphates, oxides, sulphates, nitrates, and e.g. aluminium hydroxide $Al(OH)_3$ and hydrated aluminium sulphate $(SO_4)_3Al_2$, $18H_2O$ may be mentioned.

Oxides, sulphates, phosphates, nitrates, chlorides are suitable as sources of ferrous ions (e.g. ferrous chloride and hydrated ferrous sulphate $SO_4Fe$, $7H_2O$) and of ferric ions (e.g. anhydrous ferric sulphate $(SO_4)_3Fe_2$).

Similarly, with respect to manganese, manganese carbonate and hydrated manganese sulphate $(SO_4Mn, 4H_2O)$ may be mentioned.

The quantity of stabilizer to be added is dependent on the nature of the phosphate used for producing phosphoric ions and on the concentration of the latter in the reaction medium. When less than 7 molecules are present per 100 molecules of $P_2O_5$, the stabilization is generally not complete and when more than 20 molecules are present, no further improvement of the stabilization can be observed.

As has been stated hereinbefore, the amount of sulphuric acid to be added exceeds 1.3 molecule per molecule of $P_2O_5$ to an extent which depends upon the quantity of water-soluble $P_2O_5$ that is wanted, this latter being constituted by ammonium phosphate in which the proportion of diammonium-phosphate relatively to monoammonium-phosphate depends on the final pH of the fertilizer.

More precisely, in case of attack by nitric acid alone, if $n$ designates the desired proportion of water-soluble $P_2O_5$ relatively to the total $P_2O_5$ within the reaction mass, and if $p$ designates the molar ratio of lime solubilized by acids per molecule of $P_2O_5$, the quantity of sulphuric acid which is necessary for each molecule of total $P_2O_5$ used is equal to:

$$p+2n-2 \qquad (2)$$

In fact, it is possible to check that the said proportion enables the following reactions to be obtained:

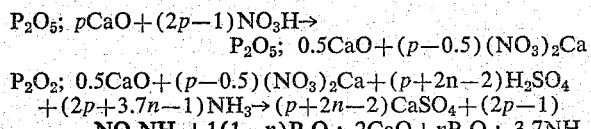

In the particular case where it is desired to obtain 25% water-soluble $P_2O_5$ and 75% citrate-soluble $P_2O_5$ ($n=0.25$), it is possible to infer from Formula 2 that for a phosphate in which $p=3.5$ the necessary quantity of sulphuric acid is equal to 2 molecules per molecule of $P_2O_5$. The reactions are thus the following ones:

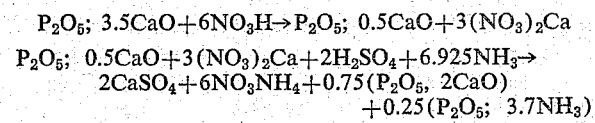

The required amount of sulphuric acid can either be added together with the nitric acid used for the attack or be distributed during the manufacturing phase corresponding to the ammoniating, before complete precipitation of dicalcium phosphate (pH below 5).

The stabilizer is also introduced when the pH is below or equal to 5. Presence of such a stabilizer according to the proportions set forth above allows, in addition, use of the stabilizing properties, known per se, of the aforementioned ions Mg, Al, Fe, Mn, so that the pH of the mass may be thereafter raised to a value in the range of 6 or 7 while dicalcium phosphate is prevented from retrograding to tricalcium phosphate. Such retrogression normally occurs with such pH values, according to the following reaction:

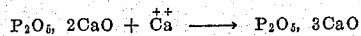

The stabilizer added according to the invention has therefore a double effect.

In the known processes, the use of ions Mg, Al, Fe, Mn as stabilizers of the dicalcium phosphate at a high pH is particularly advantageous with the nitro-carbonic method for manufacturing of a complex fertilizer in which the excess of calcium nitrate is converted to calcium carbonate by the carbon dioxide with pH rising up to 8.

The stabilizer used in these processes consists mainly of Mg ions, and the effect of the latter being increased by equimolecular amounts of $SO_4^=$ ions, magnesium sulphate is generally used.

As compared to this well-known method, the process according to this invention may be distinguished by the fact that the purpose differs as well as the manufactured fertilizers. Moreover, in the nitro-carbonic method, ammoniating is effected in the presence of low amounts of $Mg^{++}$ and $SO_4^=$ ions relative to the amounts of $P_2O_5$ ions, these amounts being possibly equal to each other. On the contrary, in present process, the amounts of $SO_4^=$ ions are notably larger than those of the Mg ions (approximately 6 to 30 times).

The used ions may be provided by sulphuric acid, in which case the latter may be wholly or partly added during attack of rock phosphate by nitric acid, which permits to obtain a fertilizer having a $N/P_2O_5$ ratio equal to one.

Sulphuric ions may be provided not only by sulphuric acid but also by a water-soluble sulphate such as ammonium or potassium sulphate. When using ammonium sulphate instead of sulphuric acid, the attack on or solubilization of the phosphate rock is effected only with nitric acid. Also when ammonium sulphate is used, the $N/P_2O_5$ ratio of the final fertilizer obtained is not equal to one; while when potassium sulphate is used, fertilizer formulae are obtained wherein the $N/P_2O_5$ ratio is equal to or even less than one.

The process according to the invention may be further employed in the case where both phosphoric acid and sulphuric acid are used and introduced successively or simultaneously.

The yield thus obtained is excellent: there is no loss of material and $P_2O_5$ solubilities in water and ammonium citrate are maintained intact whatever the duration of storage may be.

The investment required to carry out the method is very low since a conventional plant for manufacturing complex fertilizers may be conveniently used. As a 98% sulphuric acid may be used, the amount of water in effect added to the paste by this acid is very small and is lower than that added when phosphoric acid is used. For the same manufacturing capacity, the fertilizer-drying apparatus can be smaller than in the case of phosphoric acid method.

The invention will be further illustrated by the following numeric examples:

*Example 1*

Manufacturing of a fertilizer containing more than 50% of water-soluble $P_2O_5$:

420 kg. of Morocco phosphate including 33.4% $P_2O_5$ are subjected to an attack by 510 kg. of 52.1% nitric acid and 263 kg. of 98% sulphuric acid.

20 kg. of kieserite ($SO_4MG$, $1H_2O$) are added to the mass.

Then the mixture is neutralized by adding about 100 kg. of gaseous ammonia injected into the paste to obtain a final pH of 4.8–4.9. After granulating and drying this mass by known means, there are obtained 1,020 kg. of fertilizer comprising:

13.5% nitrogen, 13.85% of $P_2O_5$ of which 8.0% are water-soluble and 5.65% are soluble in ammonium citrate solution, that is to say 13.65% of available $P_2O_5$ and a proportion of water-soluble $P_2O_5$/total $P_2O_5=58\%$.

Comparison test. If kieserite had not been added, the obtained fertilizer would have contained:

13.6% nitrogen, 14.0% of $P_2O_5$ of which 1.9% are water-soluble and 9.6% are soluble in the ammonium citrate (that is to say 11.5% of available $P_2O_5$). The proportion water-soluble $P_2O_5$/total $P_2O_5$ would be of 13.5% only.

*Example 2*

Manufacture of a fertilizer containing 33% of water-soluble $P_2O_5$.

300 kg. of Morocco phosphate containing 33.6% $P_2O_5$ are attacked by 390 kg. of 52.1 nitric acid, and by 150 kg. of 98% sulphuric acid.

34.5 kg. of epsomite ($MgSO_4$, $7H_2O$) are added to the mass.

This mass is neutralized by 70 kg. of gaseous ammonia injected into the mass up to a pH comprised between 5.9 and 6.0.

After granulating and drying of this mass performed by known methods, there is obtained a fertilizer containing:

12.9% nitrogen, 13.35% of total $P_2O_5$, of which 4.4% are water-soluble and 8.75% are soluble in ammonium citrate that is to say 13.15% of $P_2O_5$ are available.

The proportion of $P_2O_5$ which is water-soluble relatively to total $P_2O_5$ is 33%.

Examples 3, 4 and 5

The same experiment as in Example 2 is performed again but with:

About a half-dose of stabilizing agent, i.e. 17.25 kg. epsomite (Example 3).

About a fourth-dose, i.e. 8.7 kg. epsomite (Example 4).

Without any stabilizing agent (Example 5).

The results obtained are shown on the following chart:

| Serial No. of the experiment | 2 | 3 | 4 | 5 |
|---|---|---|---|---|
| Quantity of the stabilizing agent | 34.5 | 17.85 | 8.7 | 0 |
| Quantity of the stabilizing agent expressed in atom-grams of Mg per gram-molecule of $P_2O_5$ | 14 | 7 | 3.5 | 0 |
| Fertilizer obtained, percent N | 12.9 | 13.15 | 14.5 | 13.8 |
| Total $P_2O_5$, percent | 13.35 | 13.4 | 14.5 | 13.75 |
| Water-soluble $P_2O_5$, prcent | 4.4 | 4.3 | 3.6 | 1.6 |
| Citrate-soluble $P_2O_5$, percent | 8.75 | 8.95 | 9.25 | 8.5 |
| Available $P_2O_5$, percent | 13.15 | 13.25 | 12.85 | 10.1 |
| Water-soluble $P_2O_5$ per total $P_2O_5$, percent | 33 | 32 | 25 | 11.5 |

Example 6

Manufacture of a fertilizer containing 33% of water-soluble $P_2O_5$.

300 kg. of Morocco phosphate including 33.6% $P_2O_5$ are attacked by 383 kg. of 53% nitric acid and by 150 kg. of 98% sulphuric acid.

There is added to the mass 23.5 kg. of aluminum sulphate $(SO_4)_3Al_2$, $18H_2O$.

The pasty mass thus obtained is then neutralized by 70 kg. of gaseous ammonia injected therein so as to obtain a final pH of 6.

After granulating and drying of this mass by known means, there is obtained a fertilizer containing 13.3% nitrogen, 13.6% $P_2O_5$, of which 4.6% are water-soluble and 8.4% are soluble in ammonium citrate, which represents 13% available $P_2O_5$ and a proportion of water-soluble $P_2O_5$/total $P_2O_5$=34%.

Example 7

With the same operation as in the preceding example, but with introduction of 47 kg. of the considered salt of aluminium there is obtained a fertilizer having the same formula and containing 34% of water-soluble $P_2O_5$.

Example 8

300 kg. of Morocco phosphate containing 33.6% $P_2O_5$ are attacked by 390 kg. of 52.1% nitric acid and by 150 kg. of 98% sulphuric acid.

34.5 kg. of epsomite ($MgSO_4$, $7H_2O$) are added to the mass.

In view of neutralization, 70 kg. of gaseous ammonia are injected into the mass up to a pH value comprised between 5.9 and 6.

After granulating and drying the mass by known means, there is obtained a fertilizer containing 12.9% nitrogen, 13.25% of total $P_2O_5$ of which 4.4% are water-soluble and 8.75% are soluble in a solution of ammonium citrate, that is to say 13.15% of available $P_2O_5$.

For a quantity of sulphuric acid equal to 1.5 kg. per kg. of $P_2O_5$ there is obtained a proportion of water-soluble $P_2O_5$ relatively to total $P_2O_5$, equal to 33%.

Example 9

The conditions of Example 8 being reproduced except that 190 kg. of 98% sulphuric acid are added to the mass, instead of 150 kg., the obtained fertilizer has after drying the following composition:

12.4% nitrogen, 12.7% of total $P_2O_5$ of which 7.5% are water-soluble and 4.95% are soluble in a solution of ammonium citrate, that is to say 12.45% $P_2O_5$ are available.

With 1.9 kg. of sulphuric acid for each kg. of $P_2O_5$ there is obtained a proportion of water-soluble $P_2O_5$ relatively to total $P_2O_5$ equal to 59%.

What we claim is:

1. In a process of manufacturing nitrosulphuric phosphate-containing fertilizers by reacting rock phosphate with nitric acid to produce a resultant mixture containing calcium nitrate and subsequently ammoniating said resultant mixture, the improvement which comprises increasing the proportion of $P_2O_5$ soluble in water relative to $P_2O_5$ soluble in ammonium citrate by adding to the material to be treated, before its pH exceeds 5, an amount of sulphuric acid such that the molar ratio $H_2SO_4/P_2O_5$ is about equal to $(p+2n-2)$ where $p$ is the molar quantity of CaO solubilized by acids per mole of $P_2O_5$ present in said rock phosphate and $n$ is the proportion of water-soluble $P_2O_5$ present in the final fertilizer relative to the total $P_2O_5$, adding to the material to be treated, before its pH exceeds 5, a small but effective amount of a water-soluble form of ions of a metal selected from the class consisting of magnesium, aluminium, iron and manganese, said ions being effective to promote stabilization of the water-soluble phosphate contained in the final product, and recovering therefrom a nitro-sulphuric phosphate-containing fertilizer containing a desirably high proportion of water-soluble phosphate.

2. A method as claimed in claim 1, in which the sulphuric acid and the metal ions are added before the pH exceeds about 3.5.

3. A method as claimed in claim 1, in which said ions are added in an amount equal to about 3.5 to 20 gram-atoms of said ions per 100 gram-molecules of $P_2O_5$.

References Cited by the Examiner

UNITED STATES PATENTS

| 2,739,054 | 5/56 | Andres et al. | 71—39 |
| 2,769,704 | 11/56 | Andres et al. | 71—39 |
| 2,874,036 | 2/59 | Datin | 71—39 |
| 2,968,543 | 1/61 | Nees et al. | 71—57 |

DONALL H. SYLVESTER, *Primary Examiner.*

GEORGE D. MITCHELL, ANTHONY SCIAMANNA, A. LOUIS MONACELL, *Examiners.*